(12) United States Patent
Okandan et al.

(10) Patent No.: US 9,391,557 B2
(45) Date of Patent: Jul. 12, 2016

(54) SOLAR TRACKING SYSTEM

(71) Applicant: Sandia Corporation, Albuquerque, NM (US)

(72) Inventors: Murat Okandan, Edgewood, NM (US); Gregory N. Nielson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 120 days.

(21) Appl. No.: 14/063,847

(22) Filed: Oct. 25, 2013

(65) Prior Publication Data

US 2014/0261637 A1 Sep. 18, 2014

Related U.S. Application Data

(60) Provisional application No. 61/790,262, filed on Mar. 15, 2013.

(51) Int. Cl.
| | | |
|---|---|---|
| *H01L 31/00* | (2006.01) | |
| *H02S 20/10* | (2014.01) | |
| *F24J 2/52* | (2006.01) | |
| *F24J 2/54* | (2006.01) | |

(52) U.S. Cl.
CPC ............... *H02S 20/10* (2014.12); *F24J 2/523* (2013.01); *F24J 2/5241* (2013.01); *F24J 2/541* (2013.01); *H02S 20/32* (2014.12); *F24J 2002/5444* (2013.01); *F24J 2002/5458* (2013.01); *Y02E 10/47* (2013.01)

(58) Field of Classification Search
CPC ........ F24J 2/52; H02S 20/00; H01L 31/0422; Y02E 10/47; Y02E 10/50
See application file for complete search history.

(56) References Cited

U.S. PATENT DOCUMENTS

| | | | |
|---|---|---|---|
| 4,088,120 | A | 5/1978 | Anderson |
| 4,128,733 | A | 12/1978 | Fraas et al. |
| 4,187,123 | A | 2/1980 | Diggs |
| 4,284,839 | A | 8/1981 | Johnson |
| 5,482,568 | A | 1/1996 | Hockaday |
| 5,501,893 | A | 3/1996 | Laermer et al. |
| 5,902,416 | A | 5/1999 | Kern et al. |
| 6,612,705 | B1 | 9/2003 | Davidson et al. |
| 6,624,548 | B1 | 9/2003 | Miller et al. |
| 6,957,894 | B2 | 10/2005 | Rabinowitz et al. |
| 6,959,993 | B2 | 11/2005 | Gross et al. |

(Continued)

FOREIGN PATENT DOCUMENTS

WO WO 2010146583 A2 * 12/2010

OTHER PUBLICATIONS

Sinton, R. A. et al, "Silicon Point Contact Concentrator Solar Cells", IEEE Electron Device Letters, Aug. 1985, pp. 405-407, vol. EDL-6, No. 8.

(Continued)

*Primary Examiner* — Matthew Martin
(74) *Attorney, Agent, or Firm* — Blakely, Sokoloff, Taylor & Zafman, LLP; Aman Talwar

(57) ABSTRACT

Solar tracking systems, as well as methods of using such solar tracking systems, are disclosed. More particularly, embodiments of the solar tracking systems include lateral supports horizontally positioned between uprights to support photovoltaic modules. The lateral supports may be raised and lowered along the uprights or translated to cause the photovoltaic modules to track the moving sun.

18 Claims, 17 Drawing Sheets

(56) References Cited

U.S. PATENT DOCUMENTS

| | | | |
|---|---|---|---|
| 6,964,486 B2 | 11/2005 | Rabinowitz | |
| 6,987,604 B2 | 1/2006 | Rabinowitz et al. | |
| 6,988,809 B2 | 1/2006 | Rabinowitz | |
| 7,077,361 B1 | 7/2006 | Rabinowitz | |
| 7,172,789 B2 | 2/2007 | Smith et al. | |
| 7,244,326 B2 | 7/2007 | Craig et al. | |
| 7,251,882 B2 | 8/2007 | Ricks et al. | |
| 8,448,390 B1 | 5/2013 | Clemens | |
| 2004/0031516 A1* | 2/2004 | Ford | 136/244 |
| 2005/0128751 A1 | 6/2005 | Roberge et al. | |
| 2008/0048102 A1 | 2/2008 | Kurtz et al. | |
| 2008/0283112 A1 | 11/2008 | Conger | |
| 2008/0295883 A1 | 12/2008 | Ducellier et al. | |
| 2012/0118353 A1 | 5/2012 | Fishler | |
| 2012/0273023 A1* | 11/2012 | Ely | 136/246 |

OTHER PUBLICATIONS

Sinton, R. A. et al, "Design Criteria for Si Point-Contact Concentrator Solar Cells", IEEE Transactions on Electron Devices, Oct. 1987, pp. 2116-2123, vol. ED-34, No. 10.

Srinivasan, U. et al, "Microstructure to Substrate Self-Assembly Using Capillary Forces," Journal of Microelectromechanical Systems, Mar. 2001, pp. 17-24, vol. 10, No. 1.

Nielson, G.N. et al., pending unpublished U.S. Appl. No. 11/933,458, filed Nov. 1, 2007.

International Search Report and Written Opinion for PCT/US2014/028059, mailed Jul. 21, 2014.

\* cited by examiner

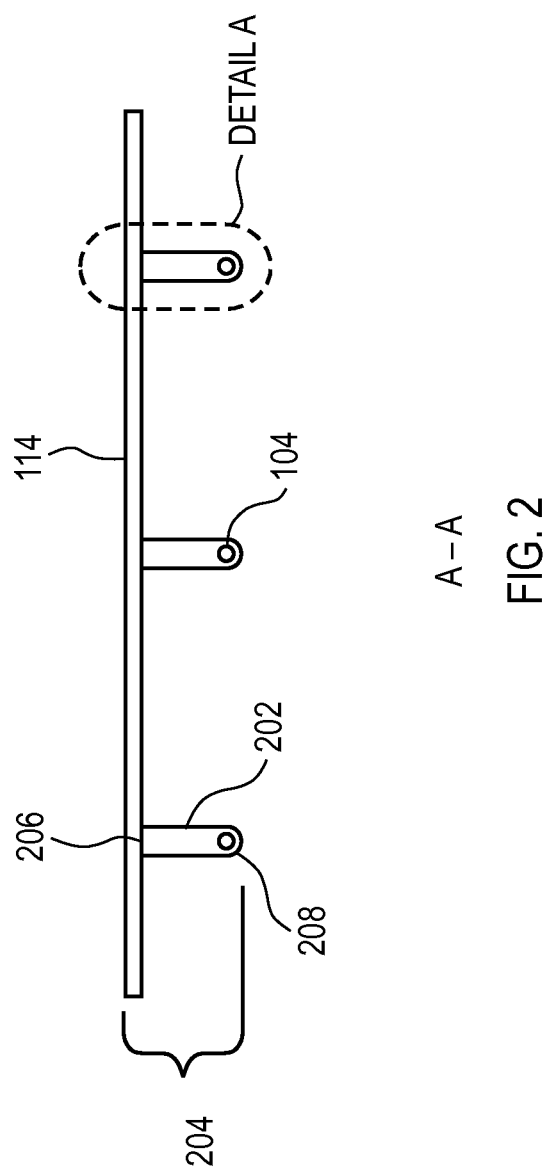

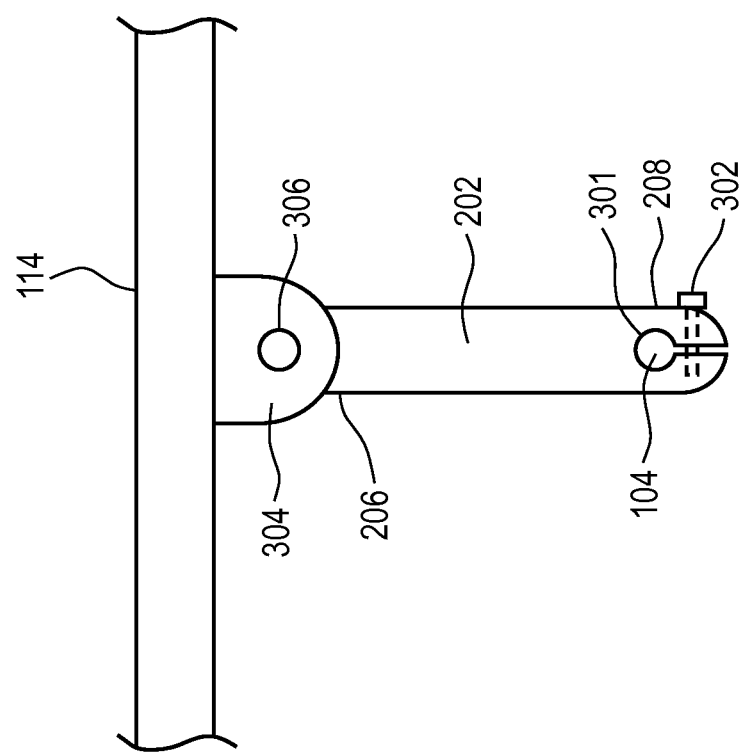

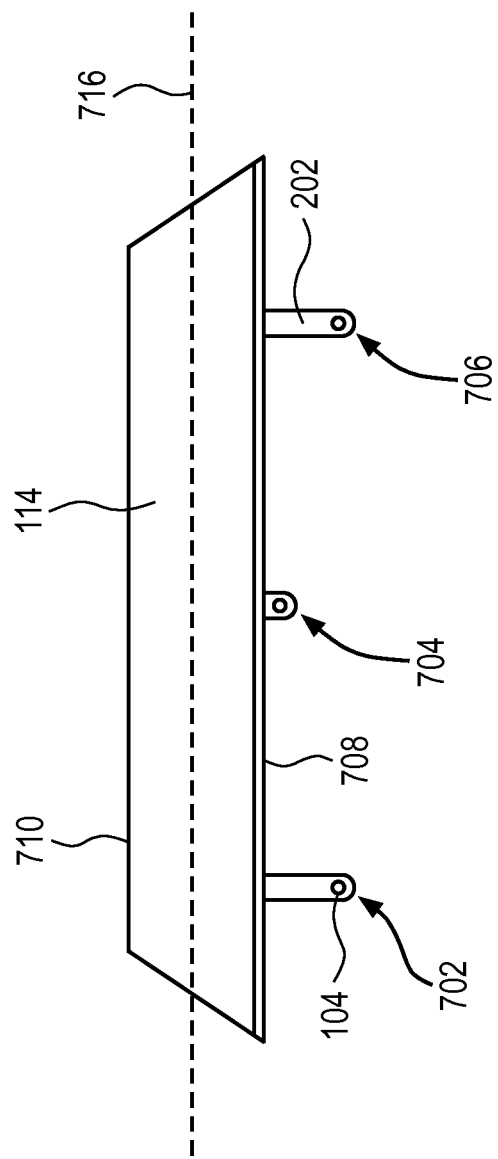

SOLAR TRACKING SYSTEM

CROSS-REFERENCE TO RELATED APPLICATIONS

This application claims the benefit of the earlier filing date of U.S. Provisional Patent Application No. 61/790,262, filed Mar. 15, 2013, entitled "SOLAR TRACKING SYSTEM." The aforementioned application is hereby incorporated by reference, in its entirety, for all purposes.

STATEMENT OF GOVERNMENT RIGHTS

This invention was developed under Contract DE-AC04-94AL85000 between Sandia Corporation and the U.S. Department of Energy. The U.S. Government has certain rights in this invention.

FIELD

The present invention relates in general to photovoltaic modules and in particular to solar tracking systems for supporting and directing photovoltaic modules.

BACKGROUND

Solar tracking systems have been used to support and direct photovoltaic modules, reflectors, and optics toward the sun. The orientation of such components allows for maximum energy harvesting from sunlight throughout a day, and therefore provides for higher energy output as compared to, for example, photovoltaic modules secured to fixed mounting systems. However, increased power output of photovoltaic modules mounted on solar tracking systems often comes at a cost. More particularly, the cost of manufacturing conventional solar trackers, e.g., single axis trackers and dual axis trackers, is usually proportional to the number of axes or degrees of freedom of such systems. For example, each axis of solar tracking may require additional motors, gear trains, and other components that increase the system expense. Such additional components may increase system size and weight, which may require specialized site selection and/or site preparation. Furthermore, such additional components may increase system profile, which may increase the risk of system damage, e.g., due to higher wind loading. As a result, the use of conventional solar tracking systems may be impractical in many applications, locations, and environmental conditions.

SUMMARY

Solar tracking systems, as well as methods of using such solar tracking systems, are disclosed. In an embodiment, a solar tracking system is provided having one or more upright and a plurality of lateral supports having first ends horizontally spaced apart from second ends. Each first end may be movable along a respective upright to change an orientation of a lateral support. The lateral supports may be substantially parallel.

In an embodiment, a plurality of actuating assemblies are coupled with the one or more uprights, and each lateral support is coupled with at least one actuating assembly. The actuating assemblies may move the lateral supports. For example, the actuating assemblies may move the first ends vertically along respective uprights or may cause the lateral supports to translate in an axial direction. In an embodiment, one or more of the lateral supports may be under tension and each actuating assembly may include both an actuator and a tensioner to keep the lateral support in tension between the actuator and the tensioner. The actuating assembly may also include a guide coupled with the lateral support at the first end and the guide may further be coupled with one of either the actuator or the tensioner such that actuation of the actuator causes the lateral support to move over the guide.

In an embodiment, the solar tracking system includes a photovoltaic module and each lateral support is coupled with the photovoltaic module at a respective coupling location. For example, each lateral support may be coupled with the photovoltaic module by a respective coupling at the respective coupling location. Furthermore, each respective coupling may include a support end coupled with the lateral support and a module end coupled with the photovoltaic module. The coupling may space the photovoltaic module apart from the lateral support.

In an embodiment, a lateral support may include a wire. For example, a lateral support may include a wire that is electrically conductive. More particularly, the wire may be configured to carry electrical signals, e.g., to transmit power and/or to carry data signals.

In an embodiment, a method is provided including supporting a photovoltaic module on a plurality of lateral supports. Each lateral support may include a first end horizontally spaced apart from a second end, and each first end may be coupled with a respective upright. The lateral supports may be substantially parallel. The first end of a first lateral support may be moved along a first upright to tilt the photovoltaic module about a first axis. Furthermore, a first end of a second lateral support may be moved along a second upright to tilt the photovoltaic module about a second axis. Additionally, the first lateral support may be translated relative to the second lateral support to rotate the photovoltaic module about a third axis perpendicular to the photovoltaic module. In an embodiment, each second end is coupled with a respective upright and the first and second ends of the lateral supports are simultaneously moved along the respective uprights to change the elevation of the photovoltaic module. In an embodiment, electricity generated by the photovoltaic module is transmitted through a lateral support. For example, electrical signals may be transmitted through a lateral support.

BRIEF DESCRIPTION OF THE DRAWINGS

The invention may best be understood by referring to the following description and accompanying drawings that are used to illustrate embodiments of the invention. In the drawings:

FIG. 2 is a section view, taken about line A-A of FIG. 1, of a photovoltaic module supported by a plurality of lateral supports in accordance with an embodiment of the invention.

FIG. 3 is a detail view, taken from Detail A of FIG. 2, of a coupling connecting a lateral support with a photovoltaic module in accordance with an embodiment of the invention.

FIGS. 7A-7C are perspective views of a photovoltaic module tilted about various axes in accordance with several embodiments of the invention.

DETAILED DESCRIPTION

In an aspect, embodiments describe a solar tracking system having a plurality of lateral supports that are independently movable and which support one or more photovoltaic modules. Each lateral support may connect to a photovoltaic module in a different location and tilt the photovoltaic module about a separate axis. For example, in an embodiment in which the photovoltaic module is supported by three lateral supports, each lateral support connected to the photovoltaic module provides the photovoltaic module with a degree of freedom. Thus, by moving the three lateral supports up or down or back and forth independently, the photovoltaic module may be tilted or rotated about three axes to track the sun in any direction with coarse or fine resolution. Furthermore, the lateral supports may be moved in unison to raise or lower the photovoltaic module without tilting the photovoltaic module. Thus, the solar tracking system exhibits substantial maneuverability to track the sun and to reposition photovoltaic modules, e.g., to gain access for maintenance, to prevent damage in high-wind loading, or to avoid shading of adjacent photovoltaic modules.

In an aspect, an embodiment of a solar tracking system includes lateral supports that are lightweight but have sufficient structural rigidity to support a photovoltaic module. For example, each lateral support may include a wire placed under tension between two points, such as between two upright structures, and the wires may be sufficiently taut so as to deflect minimally under the weight of one or more photovoltaic modules. In addition, both the upright structures and an actuating assembly coupled between an upright structure and a lateral support may be lightweight and include low profiles. Accordingly, the overall solar tracking system may be both inexpensive to construct and deployable on various terrain and at various locations with minimal or no site preparation. Furthermore, the lightweight solar tracking system components may have low cross-sectional area such that the system experiences low drag and may therefore be suitable for use under high-wind loading.

In an aspect, one or more lateral supports supporting a photovoltaic module may include an electrically conductive wire capable of carrying electricity toward or away from the photovoltaic module. For example, in an embodiment, a lateral support includes a conductive wire to carry electricity generated by the photovoltaic module toward power components, e.g., a battery bank or power inverter. In another embodiment, a lateral support includes a wire to carry electrical signals, such as data or communication signals, to or away from electronics mounted near a photovoltaic module.

Figure 1:
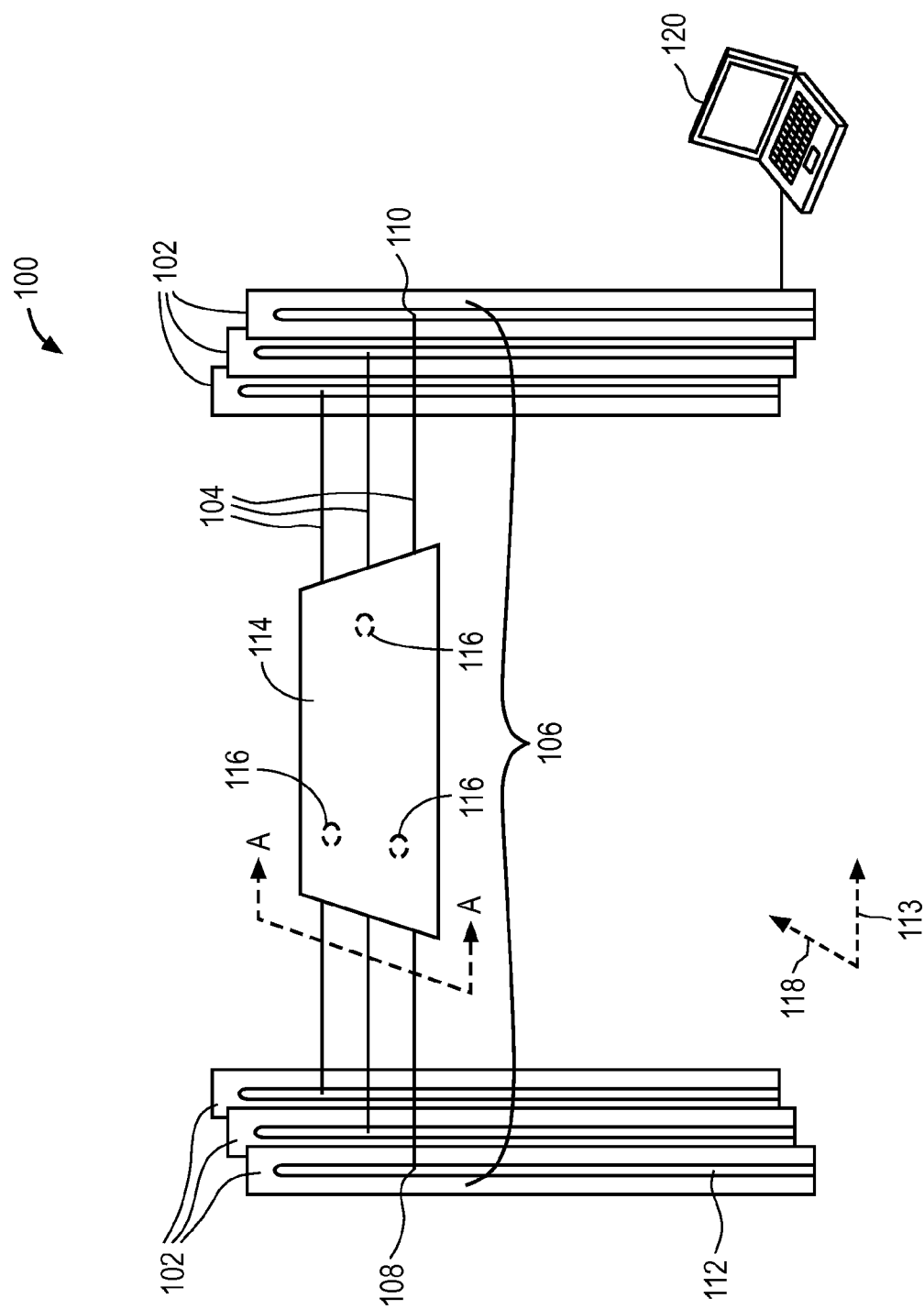
FIG. 1 is a perspective view of a solar tracking system in accordance with an embodiment of the invention.

Referring to FIG. 1, a perspective view of a solar tracking system is shown in accordance with an embodiment. In an embodiment, solar tracking system 100 includes one or more upright 102 supporting a plurality of lateral supports 104. For example, uprights 102 may include vertically standing poles, with two poles supporting a single lateral support 104. Thus, a pair of uprights 102 may be separated by a support length 106 over which lateral support 104 is stretched. More specifically, lateral support 104 may include a first end 108 supported by a first upright 102 and a second end 110 supported by a second upright 102. Furthermore, first end 108 and second end 110 may move along respective support tracks 112 of upright 102 under the control of an actuator. In response to such movement, an elevation and/or an angle of each lateral support 104 may be independently adjusted.

Multiple lateral supports 104 may be supported in a series between one or more uprights 102. For example, three pairs of uprights 102 may support three lateral supports 104 such that the lateral supports 104 run generally parallel to each other in an x-direction 113. In an embodiment, lateral supports 104 may not be exactly parallel, but nonetheless may not cross when viewed from above. Thus, each lateral support 104 may be independently moved along a respective support track 112 without interfering with or contacting another lateral support 104.

In an embodiment, a photovoltaic module 114 is supported on lateral supports 104 between uprights 102. For example, photovoltaic module 114 may be physically connected with lateral supports 104 at one or more coupling location 116. Coupling locations 116 may be on an upper or lower surface of photovoltaic module 114, such that photovoltaic module 114 either rests above lateral supports 104 or hangs from lateral supports 104. In an embodiment, each coupling location 116 is offset from the others in at least one of either x-direction 113 or a y-direction 118. Thus, each lateral support 104 connects to photovoltaic module 114 in a different location, such that photovoltaic module 114 may be moved with several degrees of freedom in response to raising and lowering of individual lateral supports 104. Consequently, solar tracking system 100 may pivot or tilt photovoltaic module 114 about multiple axes to track the sun as it crosses the sky from east to west and seasonally oscillates between northern and southern maxima.

Movement of first ends 108 and second ends 110 of lateral supports 104 may be achieved in numerous manners. For example, movement may be accomplished manually or automatically. However, in an embodiment, movement is automatically effected by one or more actuating assemblies coupled with lateral support 104. An actuating assembly may also be coupled with an upright 102. Furthermore, an actuating assembly may both place tension on lateral support 104 and move lateral support 104 up and down along upright 102. Several embodiments of actuating assemblies are described below. In an embodiment, a computer 120 controls one or more actuating assembly based on received inputs, e.g., encoded position data, weather condition data, etc. Computer 120 control signals may be amplified to drive various actuators of actuating assemblies that move first end 108 and second end 110. Thus, computer 120 control signals may be output based on algorithms intended to cause solar tracking system 100 to direct photovoltaic module 114 toward the sun.

Still referring to FIG. 1, a single photovoltaic module 114 is shown supported between upright 102 pairs. However, as explained further below, multiple photovoltaic modules 114 may be supported between the upright 102 pairs. For example, by moving uprights 102 further apart to widen support length 106, a plurality of photovoltaic modules 114 may be supported in a row by lateral supports 104. Similarly, rows of photovoltaic modules 114 supported by lateral supports between uprights may be replicated and arranged into columns in y-direction 118 to form a larger photovoltaic module 114 array. Thus, movement of lateral supports 104 may move an entire row of photovoltaic modules 114 simultaneously and an array of one or more rows of photovoltaic modules 114 may be moved together to track the sun.

Referring to FIG. 2, a section view, taken about line A-A of FIG. 1, of a photovoltaic module supported by a plurality of lateral supports is shown in accordance with an embodiment. Each photovoltaic module 114 in a solar tracking system 100 may be connected with one or more lateral supports 104 via one or more coupling 202. In addition to physically connecting photovoltaic module 114 with lateral support 104, coupling 202 may also separate photovoltaic module 114 from lateral support 104 by a support offset 204. More specifically, a module end 206 of coupling 202 may be spaced apart from a support end 208 of coupling 202 by a support offset 204. Thus, coupling 202 body may be a rigid standoff post that extends straightly between lateral support 104 and either photovoltaic module 114 or a frame supporting photovoltaic module 114. Alternatively, coupling 202 may include a body that slants and/or curves between lateral support 104 and photovoltaic module 114 while spacing those components apart.

In an embodiment, lateral supports 104 may be used to transmit electricity. For example, lateral supports 104 may include electrically conductive wire or cables that are capable of carrying electrical signals. Lateral supports 104 may include single stranded wire or multi-stranded wires for this purpose. Furthermore, wires of lateral supports 104 that carry electrical signals may be mechanically strengthened by incorporating them within a reinforcement cable or jacketing. For example, lateral support 104 may include a strand of copper wire to carry an electrical signal and the copper wire may be braided with one or more strands of steel wire to create a cable that improves the overall strength of lateral support 104. A portion of the electrical signal wire, or the overall cable, may further be insulated within a jacket of dielectric material to prevent signal loss or electrical shock.

A lateral support 104 formed from wires may carry a variety of electrical signals. For example, in an embodiment, lateral support 104 may carry data and/or communication signals through wires incorporated within lateral support 104. These signals may include output signals from sensors associated with photovoltaic module 114. For example, signals may include light meter signals that encode information about instantaneous light received by photovoltaic modules 114. Alternatively, signals may include strain gauge signals that encode information about loading on photovoltaic modules 114, e.g., wind loading or snow loading. The signals may be processed by computer 120 as feedback to algorithms intended to control solar tracking system 100. For example, light meter signals may be processed to control photovoltaic module 114 orientation to maximize solar energy harvesting. Alternatively, strain gauge signals may be processed to control photovoltaic module 114 elevation to mitigate the risk of wind damage.

In addition to data and communication signals, lateral supports 104 may also include wires that convey power generated by photovoltaic modules 114 to external power components. For example, electricity generated by photovoltaic modules 114 may be carried through a wire of lateral support 104 to a battery bank or power inverter. In an embodiment, a lateral support 104 includes at least three wires having different electrical purposes. A first wire may be an electrically conductive wire that serves as a ground wire, and which can also carry high frequency data signals as described above. A second wire may be electrically conductive and serve as a power wire to carry electrical current produced by the photoelectric effect away from photovoltaic module 114. In addition, a third wire may be a mechanical wire to provide additional strength to the lateral support 104. The mechanical wire may or may not be electrically conductive, but may enhance the strength of lateral support 104 such that lateral support 104 may be placed under tension without damaging or impeding the function of the first and second wires.

In addition to strengthening lateral support 104 under tension, a mechanical wire or an additional element may be included within lateral support 104 to enhance the bending strength of portions of lateral support 104. For example, portions of lateral support 104 that support photovoltaic module 114 may be stiffened to resist side loading from the weight of photovoltaic modules 114 on lateral supports 104. In an embodiment, lateral supports 104 are reinforced near couplings 202 to mitigate such bending stresses. For example, a stiff rod may be integrated within a lateral support 104 cable near a coupling 202 to provide additional bending stiffness to lateral support 104 in that region. In another embodiment, a tubular jacket may be placed around lateral support 104 near coupling 202 to providing additional bending stiffness to lateral support 104 in that area.

Referring to FIG. 3, a detail view, taken from Detail A of FIG. 2, of a coupling connecting a lateral support with a photovoltaic module is shown in accordance with an embodiment. In an embodiment, coupling 202 is a standoff post having a circular bore 301 formed through support end 208 in a direction to receive lateral support 104. For example, coupling 202 may include a slotted clamping feature that fits over lateral support 104 and is tightened down by a fastener 302 to clamp lateral support 104 by a fastener 302. In an alternative embodiment, support end 208 of coupling 202 may connect with lateral support 104 using other clamping mechanisms, such as a vise mechanism, a U-bolt clamp, etc.

Optionally, coupling 202 may be able to pivot relative to either photovoltaic module 114 or lateral support 104. For example, coupling 202 may not clamp tightly on lateral support 104, but instead may provide for a slip fit between lateral support 104 and the circular bore 301. Accordingly, coupling 202 may be able to rotate freely about a longitudinal axis of lateral support 104. Alternatively or additionally, an articulating mechanism may be used to provide relative movement between coupling 202 and photovoltaic module 114. For example, a frame portion of photovoltaic module 114 may include a hinge 304 to receive a module end 206 of coupling 202. Pin 306 may further be inserted into hinge 304 through a hole in coupling 202 to permit coupling 202 to rotate about pin 306. Additional manners of providing relative movement between one or more of photovoltaic module 114, coupling 202, and lateral support 104 may be implemented, including additional hinge or joint mechanisms, to increase the overall structural flexibility of solar tracking system 100.

In addition to providing a mechanical connection between photovoltaic module 114 and lateral support 104, coupling 202 may also provide for electrical communication between photovoltaic module 114 and lateral support 104. More specifically, coupling 202 may act as an electrical clamp to connect with lateral support 104 and carry electricity between photovoltaic module 114 and lateral support 104. As described above, lateral supports 104 may convey electricity and electrical signals to and away from photovoltaic module 114, and thus, coupling 202 may act as a link in the electrical pathway. Accordingly, coupling 202 may be formed from electrically conductive materials to allow for electricity and electrical signals to be carried through coupling 202 from photovoltaic module 114 to lateral support 104.

Alternatively, electrical wires may connect with lateral support 104 near support end 208 and extend toward module end 206 to connect to photovoltaic module 114. In an embodiment, coupling 202 does not directly convey electricity, but instead provides structural support to electrical wires, e.g., electrical wires may be wrapped about or fastened to coupling 202. Support offset 204 may remain constant near coupling 202 and thus connecting electrical wires between photovoltaic module 114 and lateral support 104 near coupling 202 may ensure that the electrical wires do not undergo significant mechanical strain. That is, the distance between photovoltaic module 114 and lateral support 104 may be relatively constant based on coupling 202 length, and therefore electrical wires traversing the distance near coupling 202 may not stretch or bend significantly. Therefore, coupling 202 may facilitate electrical transmission either directly or indirectly.

Figure 4A:
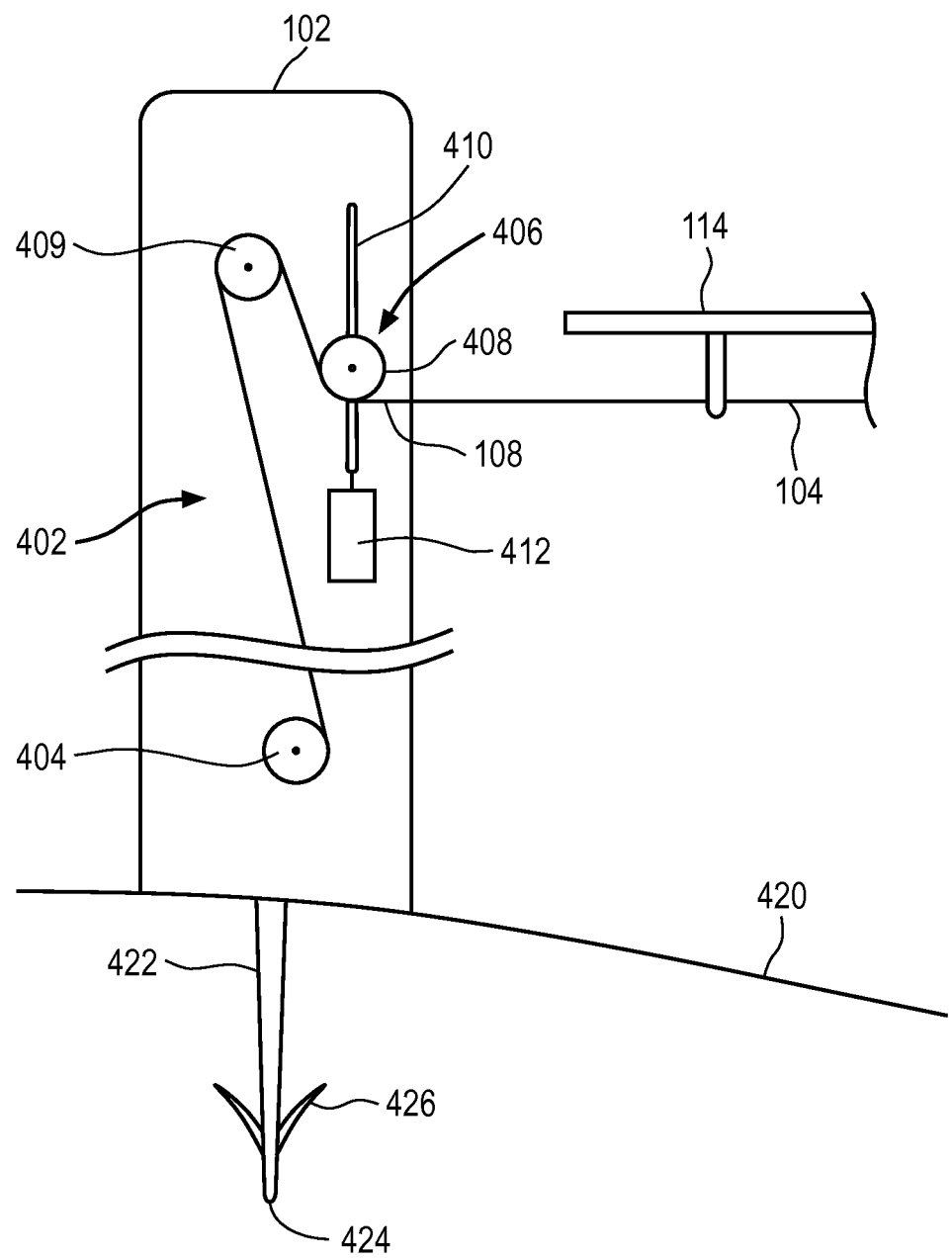
FIGS. 4A-4C are broken section views of various actuating assemblies in accordance with several embodiments of the invention.
Figure 4B:
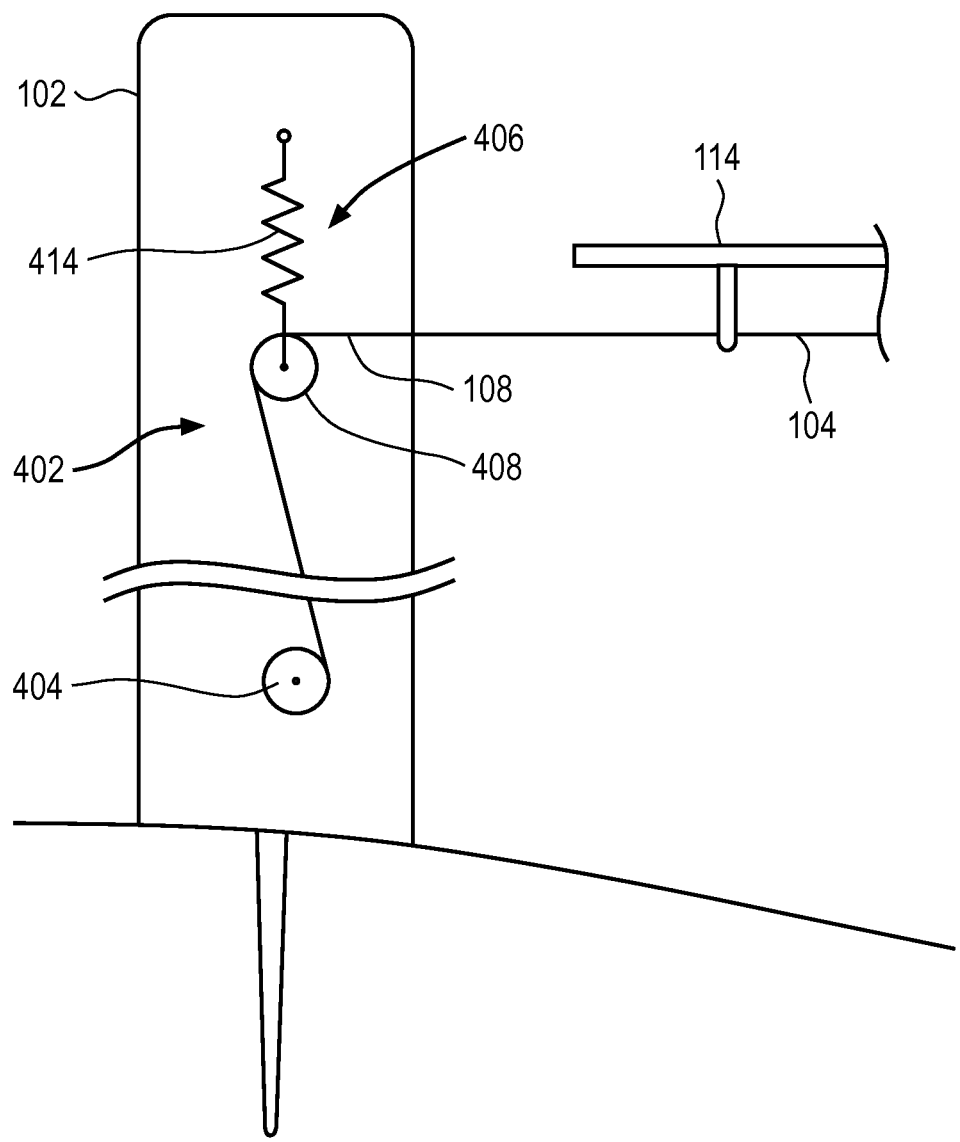
Figure 4C:
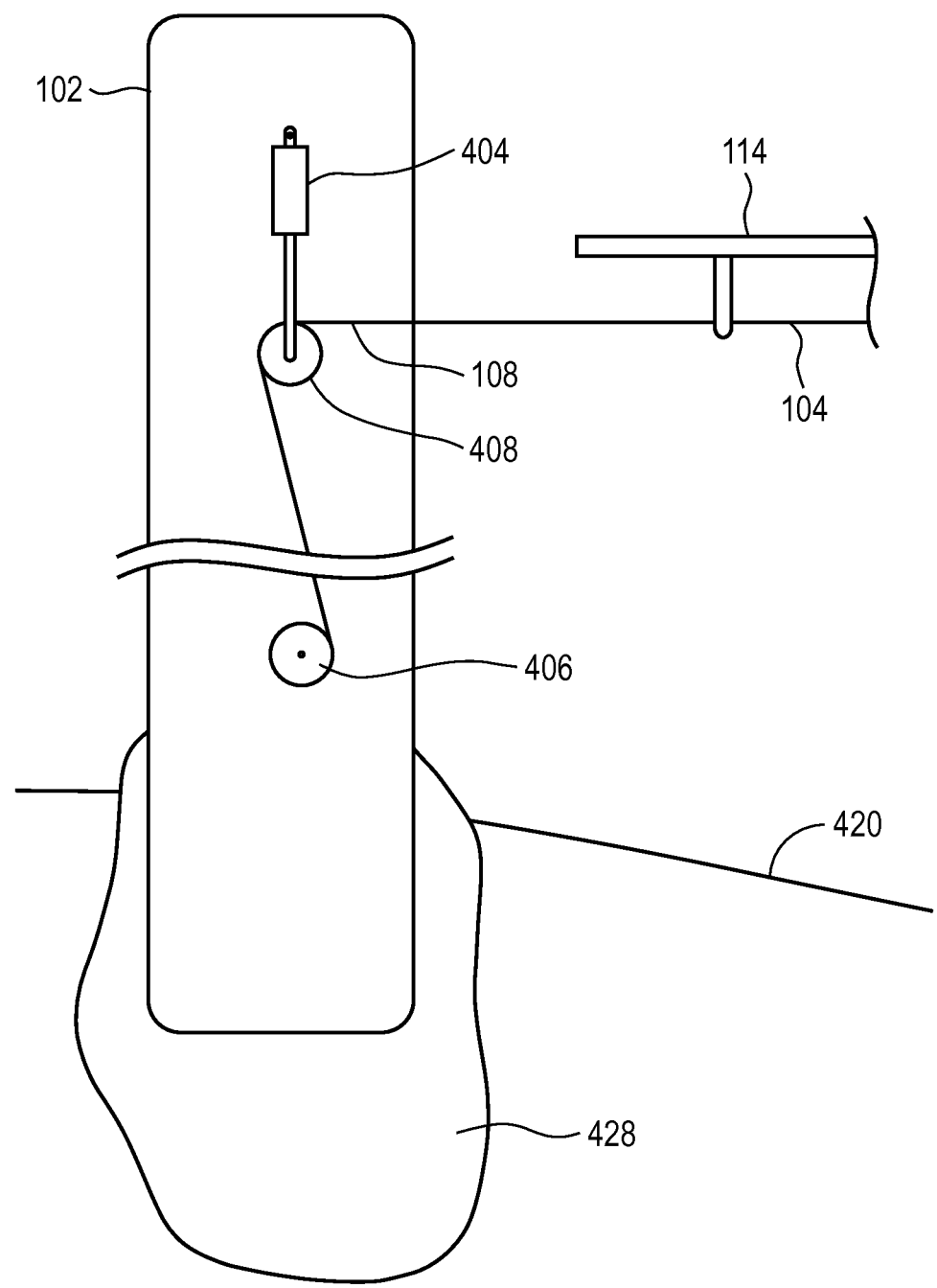

Referring to FIGS. 4A-4C, broken section views of various actuating assemblies are shown in accordance with several embodiments. FIG. 4A shows an actuating assembly 402 associated with an upright 102. In an embodiment, actuating assembly 402 is coupled between upright 102 and lateral support 104. For example, various components of actuating assembly 402 may be fixed to upright 102 and/or receive lateral support 104. Actuating assembly 402 may include components to both move lateral support 104 and to place lateral support 104 under tension. For example, movement of lateral support 104 may be effected by an actuator 404 and tensioning of lateral support 104 may be effected by a tensioner 406.

Actuator 404 may include any of numerous mechanical, electrical, pneumatic, and/or hydraulic actuators. For example, actuator 404 may include an electrical motor having a shaft attached to a spindle, which lateral support 104 wraps around. Rotation of the spindle by the motor may wind or unwind lateral support 104. Lateral support 104 may be directly routed to actuator 404, but in an embodiment, lateral support 104 tracks through one or more guide from first end 108 before reaching actuator 404. Furthermore, one of the guides may be associated with a tensioner 406 to keep lateral support 104 under tension between first end 108 and actuator 404.

In an embodiment, actuator 404 may be used to drive movement of a plurality of lateral supports 104. For example, where sequential rows of photovoltaic modules 114 are arranged into a column of an array, each row of photovoltaic modules 114 may have corresponding lateral supports 104. That is, a photovoltaic module 114 in a first row may include a connection to a first lateral support 104, and a photovoltaic module 114 in a second row may include a connection to a second lateral support 104. Movement of the first lateral support 104 and second lateral support 104 in the same direction may cause both photovoltaic modules 114 to tilt about same or parallel axes. Accordingly, the first lateral support 104 and the second lateral support 104 may be moved through a different series of guides to a single actuator 404 spindle, shaft, or other actuator component. Thus, actuation of the single actuator 404 may cause simultaneous movement of the two lateral supports 104 and the corresponding photovoltaic modules 114. By multi-purposing a single actuator 404 to move corresponding lateral supports 104 of different photovoltaic module 114 arrays, the total number of actuators 404 in solar tracking system 100 may be reduced, which can further reduce the overall system cost.

In an embodiment, tensioner 406 includes a moving guide 408 that is slidable within a slot 410 such that moving guide 408 may move transverse to lateral support 104. Thus, moving guide 408 may press on lateral support 104 opposite to a force applied by another fixed guide 409, thereby creating tension in lateral support 104. A weight 412 may hang from moving guide 408 to apply the transverse load to lateral support 104. Thus, in at least one embodiment, tension in lateral support 104 may be passively generated by the application of a weighted side load that stretches lateral support 104 between first end 108 and actuator 404. Accordingly, sufficient tension may be developed throughout lateral support 104 to maintain photovoltaic module 114 in a lifted position.

FIG. 4B shows an alternative embodiment of actuating assembly 402 used to move lateral support 104 relative to upright 102 and to keep lateral support 104 under tension to support photovoltaic module 114. Actuating assembly 402 may include actuator 404, such as an electric motor connected with a spindle to wind and unwind lateral support 104. Furthermore, actuating assembly 402 may include tensioner 406 to keep lateral support 104 under tension. In an embodiment, tensioner 406 includes a guide near first end 108 to redirect lateral support 104 from a horizontal direction toward actuator 404. Furthermore, in an embodiment, tensioner 406 includes a spring 414, such as an extension spring, that is fixed at one end and is connected to moving guide 408 at another end. Thus, moving guide 408 may translate in a vertical direction toward and away from the fixed end depending on the load that is placed on moving guide 408 by actuator 404. Translation of moving guide 408 may be constrained by a slot, such as slot 410. More specifically, actuator 404 may wind up lateral support 104 to pull on moving guide 408 and stretch spring 414, or actuator 404 may unwind lateral support 104 to let out lateral support 104 and to allow spring 414 to collapse. Consequently, first end 108 of lateral support 104 may be moved up and down with the extension and collapse of spring 414 depending on the movement of actuator 404.

Spring 414 may be under a preload in an unextended position corresponding to a fully raised position of first end 108 of lateral support 104. Similarly, spring 414 may store more energy as it is extended until first end 108 of lateral support 104 is in a fully lowered position. Accordingly, moving guide 408 connected with spring 414 may always apply some transverse loading to lateral support 104 in a direction opposite from actuator 404, causing lateral support 104 to remain in tension and to maintain photovoltaic module 114 in a lifted position.

FIG. 4C shows another embodiment of actuating assembly 402. In an embodiment, rather than placing transverse loading on lateral support 104, tensioner 406 may instead apply an axial load to lateral support 104 to stretch lateral support 104. For example, tensioner 406 may include a rotary spring connected with a spindle that lateral support 104 wraps around. Thus, tensioner 406 may wind and unwind lateral support 104 to maintain tension on lateral support 104 that maintains photovoltaic module 114 in a lifted position.

In an embodiment, actuator 404 includes a linear actuator 404 connected with moving guide 408 that lateral support 104 runs over. Actuator 404 may therefore be extended or retracted to apply transverse loading to lateral support 104 in a direction opposite from the axial load applied to lateral support 104 by tensioner 406. Accordingly, actuator 404 may be extended to move first end 108 of lateral support 104 downward or may be retracted to move first end 108 of lateral support 104 upward.

FIGS. 4A through 4C also show a variety of manners in which upright 102 of solar tracking system 100 may be secured at an installation site. For example, referring to FIG. 4A, upright 102 may be secured to ground 420 by an anchor spike 422. In an embodiment, anchor spike 422 includes a pointed end 424 that may be pounded or otherwise driven into the ground 420. Optionally, one or more tines 426 may be used to stabilize upright 102 and prevent upright 102 from being removed from ground 420 or tipped over by side loading. In another embodiment, as shown in FIG. 4C, upright 102 may be secured to a footing 428. For example, footing 428 may include concrete cast within a hole in ground 420. Upright 102 may be held firmly within footing 428 with or without the use of additional securement features, such as anchor bolts or tines 426. Accordingly, a variety of footings 428, anchors, and other securements may be used to maintain uprights 102 in a fixed position relative to ground 420, even under external loading, such as wind loading. Furthermore, the range of securements that may be feasibly deployed for this purpose, such as the alternative embodiments provided above, may be low-cost and suitable for use in varied terrain. For example, uprights 102 secured by anchor spikes 422 may be deployed on flat or uneven ground 420. Furthermore, anchor spikes or foundations may be placed within sand, rock, silt, clay, or any other soil type, providing for a virtually unrestricted choice of deployment sites for solar tracking system 100.

In addition to the range of securement techniques that can allow for solar tracking system 100 to be deployed on virtually any terrain, the minimal weight of solar tracking system 100 may also allow for deployment of solar tracking system 100 at locations weight capacity restrictions. More particularly, many existing structures may have been constructed prior to the advent of solar technologies and/or may have been built without planning for the deployment of photovoltaic modules. Consequently, enormous surface areas exist that would be ideal for solar harvesting, but which are unable to be utilized for this purpose due to their inability to support the weight of existing solar trackers. Examples of such structures include building rooftops 502 and boat decks. Due to the minimal structural requirements and weight of the solar tracking systems 100 described above, many of these underused structures may now be eligible to accommodate photovoltaic module arrays to generate power. In addition, the tension and rigidity provided by the tracker structure can be used to supplement and enhance the mechanical properties of the host structure.

Figure 5:
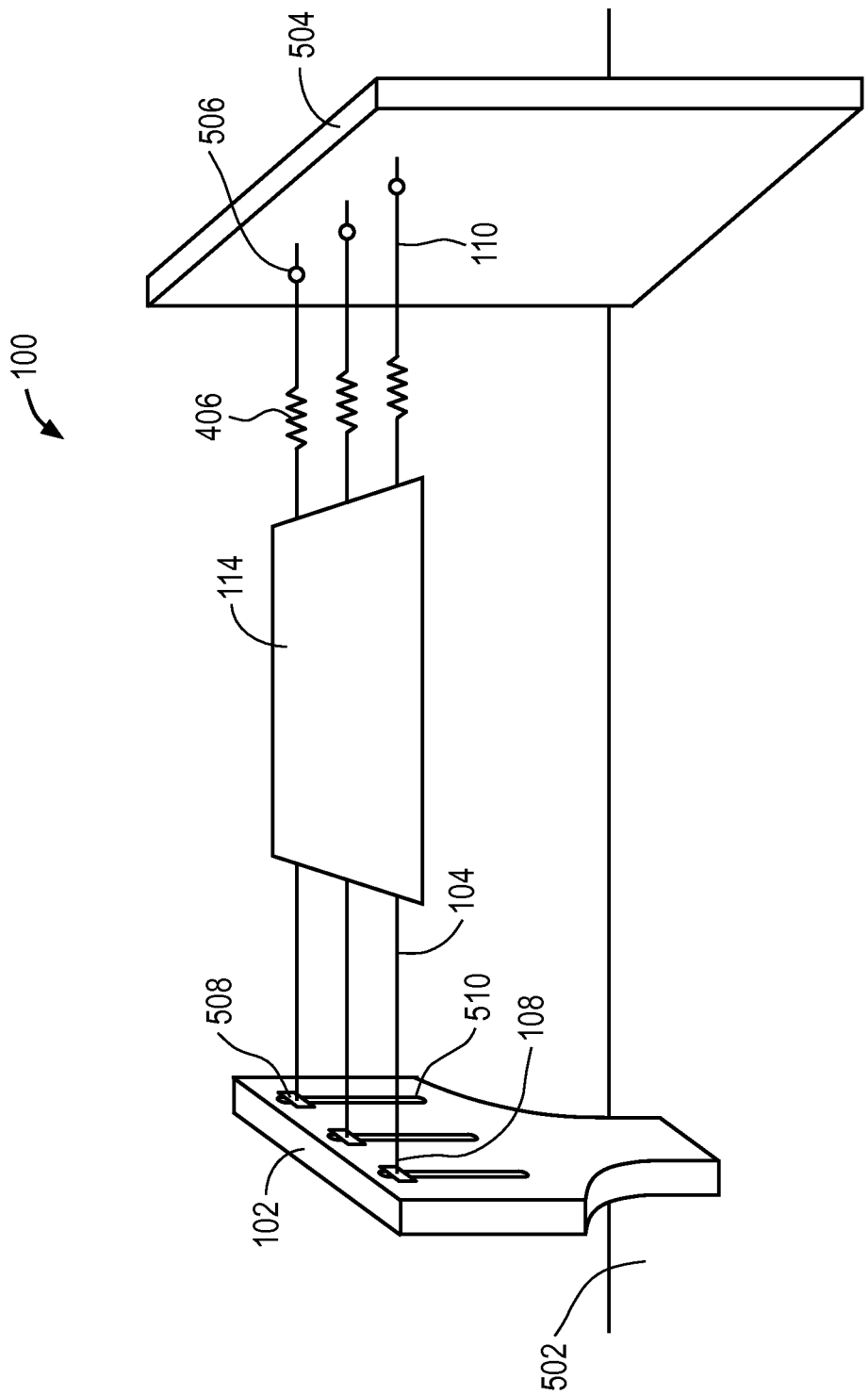
FIG. 5 is a perspective view of a solar tracking system installed on a rooftop in accordance with an embodiment of the invention.

Referring to FIG. 5, a perspective view of a solar tracking system installed on a rooftop is shown in accordance with an embodiment. To further illustrate the variety of deployment configurations possible, solar tracking system 100 is shown with a single upright 102 spaced apart from a wall 504 on rooftop 502. Thus, in an embodiment, lateral supports 104 may extend horizontally between upright 102 and a structure external to solar tracking system 100. For example, second ends 110 of lateral supports 104 may be connected to one or more anchor bolt 506 secured in wall 504. Photovoltaic module 114 may be supported on lateral supports 104. In an embodiment, actuating assembly 402 may be distributed throughout solar tracking system 100 rather than being localized on upright 102. For example, tensioner 406 may be placed in line with lateral supports 104 to maintain the necessary tension in lateral supports 104 necessary to support the weight of photovoltaic module 114. For example, tensioner 406 may include an extension spring that extends or retracts to remove any slack in lateral support 104 between first end 108 and second end 110. Thus, in an embodiment, tensioner 406 may be directly integrated within the length of lateral support 104 to provide tension thereto, rather than being external to lateral support 104 as described with respect to FIGS. 4A-4C.

Photovoltaic module 114 supported on lateral supports 104 may be tipped and tilted according to movement of lateral supports 104. In an embodiment, lateral supports 104 may be directly connected to an actuator 404 having a linear stage that moves upward and downward along upright 102. As shown, a single upright 102 may support multiple linear stages, thereby minimizing the quantity of footings 428 and anchors that need be secured to rooftop 502. First end 108 may be connected to a platform 508 of the linear stage that moves in a guided direction relative to a base 510 of the linear stage. The base 510 of the linear stage may further be secured to upright 102 and the platform 508 may thus be driven by, e.g., a leadscrew, a pneumatic actuator, a hydraulic actuator, or any other linear actuator to cause first end 108 to move up and down relative to upright 102 and relative to second end 110 at wall 504. Thus, lateral supports 104 may be raised and lowered by movement of linear stages secured to uprights 102 to change an orientation of photovoltaic module 114.

In another embodiment, lateral support 104 may include a rigid structure, such as a telescoping rod, supported horizontally between uprights 102. For example, an end of a telescoping rod may be coupled with an actuator 404 on a first upright 102, and another end of the telescoping rod may be coupled with an actuator 404 on a second upright 102. In an embodiment, the actuators 404 include linear stages and the rod ends may be connected to platforms 508 of the linear stages. Thus, the ends may be moved up and down by the stages, and as the ends move, the angle of the telescoping rod may change. To accommodate such angle changes, the rod may extend or contract to accommodate any change in length between the ends that results from the tipping of the lateral support 104 rod. As a result, a solar tracking system 100 may be provided with lateral supports 104 that need not be kept in tension, since the rods may include sufficient rigidity to support the weight of photovoltaic modules 114. Furthermore, given that the rods may be constructed with low cross-sectional profiles, such embodiments may also provide for reduced risk of damage under wind loading while also providing improved maneuverability consistent with the other embodiments described herein.

Figure 6:
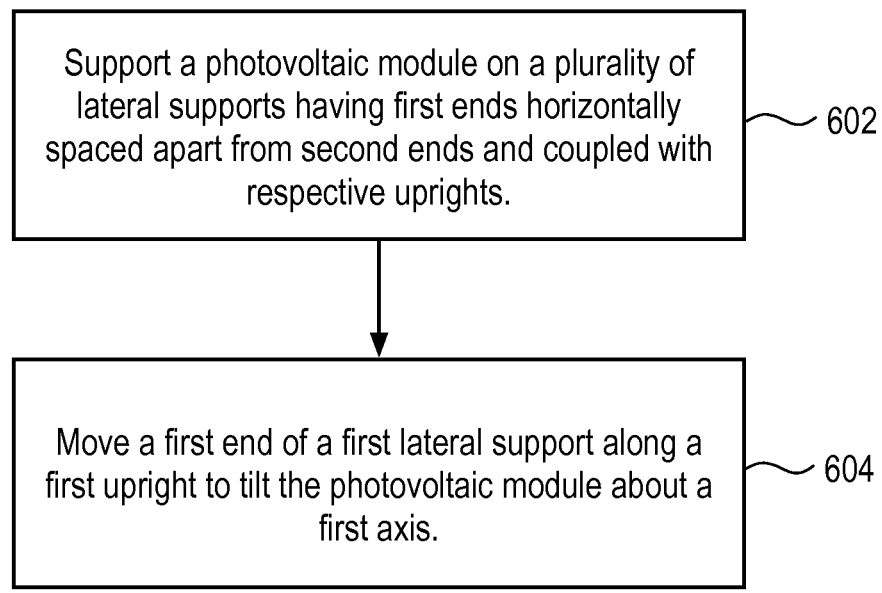
FIG. 6 is a flowchart of a method of tilting a photovoltaic module in accordance with an embodiment of the invention.

Referring to FIG. 6, a flowchart of a method of tilting a photovoltaic module is shown in accordance with an embodiment. At operation 602, a photovoltaic module 114 may be supported on one or more lateral supports 104 with couplings 202. The lateral supports 104 may be stretched between uprights 102, with a first end 108 located near one upright 102 and a second end 110 located near another upright 102. At operation 604, lateral supports 104 may be moved to transmit movement to the photovoltaic module 114. As a first end 108 and/or a second end 110 of lateral support 104 is moved upward or downward by actuator 404, photovoltaic module 114 may also move upward or downward at a location where coupling 202 connects photovoltaic module 114 to the moving lateral support 104. In an instance in which three lateral supports 104 are connected with a single photovoltaic module 114 at three separate locations, movement of the lateral supports 104 can tip and tilt photovoltaic module 114 with three degrees of freedom. Accordingly, photovoltaic module 114 may be tipped, tilted, and rotated about three axes, and furthermore, photovoltaic module 114 may undergo some translational movement as the photovoltaic module 114 is tipped and tilted. Control over the movement of lateral supports 104 and thus the tipping and tilting of photovoltaic module 114 may be achieved using computer 120 to drive actuating assembly. More particularly, positional inputs and feedback from sensors in solar tracking system 100 may be processed by computer 120 in a control loop to drive actuating assembly and move lateral supports 104 as required to track the sun.

Figure 7A:
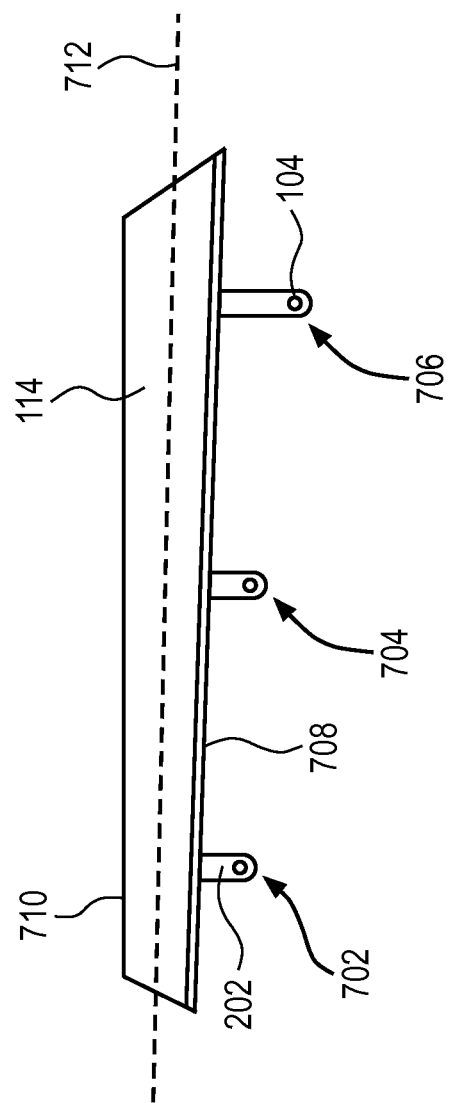
Figure 7B:
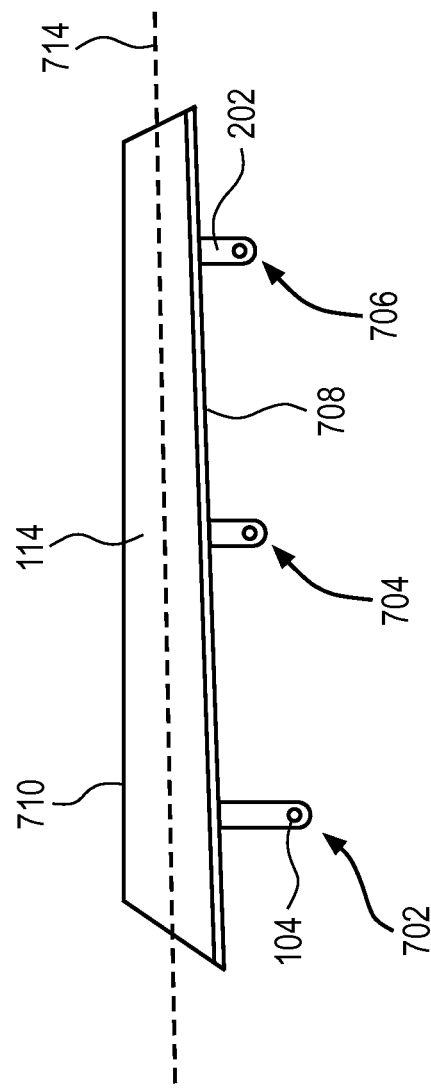

Referring to FIGS. 7A-7C, perspective views of a photovoltaic module tilted about various axes are shown in accordance with several embodiments. FIG. 7A shows a photovoltaic module 114 supported on three lateral supports 104 by couplings 202. The illustrated view is in a direction of line A-A of FIG. 1, and thus for ease of description, the three lateral supports 104 are referred to below as a left support 702, a middle support 704, and a right support 706, although this nomenclature is not intended to be restrictive. Furthermore, in an embodiment as shown in FIG. 1, left support 702 and right support 706 may be connected toward a front edge 708 of photovoltaic module 114 and middle support 704 may be connected toward a rear edge 710 of photovoltaic module 114. However, these locations are not restrictive since lateral supports 104 may be connected to photovoltaic modules 114 in numerous locations while still providing photovoltaic module 114 with several degrees of freedom of movement.

In an embodiment, by controlling actuating assemblies 402 associated with the lateral supports 104 such that left support 702 and middle support 704 remain stationary while right support 706 is lowered, a front-right corner of photovoltaic module 114 will be pulled downward, resulting in photovoltaic module 114 tilting about a first axis 712. More particularly, photovoltaic module 114 may be tilted about an axis that runs generally parallel to an imaginary axis passing through the locations where left support 702 and middle support 704 connect with respective lateral supports 104.

FIG. 7B shows photovoltaic module 114 tilting about another axis according to movement of lateral supports 104. In an embodiment, actuating assemblies 402 associated with the lateral supports 104 may be controlled such that right support 706 and middle support 704 remain stationary while left support 702 is lowered. Accordingly, photovoltaic module 114 may tilt about a second axis 714 as a front left corner of photovoltaic module 114 is pulled downward. More particularly, photovoltaic module 114 may be tilted about an axis that runs generally parallel to an imaginary axis passing through the locations where middle support 704 and right support 706 connect with respective lateral supports 104. Thus, in an embodiment, axis 712 and axis 714 may be generally orthogonal to each other.

FIG. 7C shows photovoltaic module 114 being tipped in another manner. In an embodiment, actuating assemblies 402 associated with the lateral supports 104 may be controlled such that middle support 704 is raised while left support 702 and right support 706 are maintained in a stationary position. Accordingly, photovoltaic module 114 may tilt about a third axis 716. More particularly, photovoltaic module 114 may be tilted about an axis that runs generally parallel to an imaginary axis passing through the locations where left support 702 and right support 706 connect with respective lateral supports 104. Thus, in an embodiment, axis 716 may be generally parallel to a photovoltaic module 114 edge, e.g., front edge 708.

In addition to tilting, photovoltaic module 114 may be rotated about various axes. For example, translation of a lateral support 104 from side to side relative to other lateral supports 104 may be used to cause photovoltaic modules 114 to rotate about an axis perpendicular to the module plane. Lateral movement, i.e., translation, of a lateral support 104 may be effected using the actuating assemblies 402 described above, or may be achieved through the inclusion of additional actuators that apply an axial load on a lateral support 104 to pull or push the lateral support 104 in an axial direction. In an embodiment, lateral support 104 connected with left support 702 may be translated axially, e.g., into the page, and lateral support 104 connected with right support 706 may be translated axially, e.g., out of the page, while lateral support 104 connected with middle support 704 may be maintained in a stationary location. As a result, photovoltaic module 114 may rotate about an axis perpendicular to third axis 716, i.e., photovoltaic module 114 may rotate about an axis perpendicular to a top surface of photovoltaic module. Accordingly, lateral supports 104 may be raised, lowered, and translated to cause photovoltaic module to be tipped, tilted, and rotated about three axes to track the sun in any direction.

The variety of adjustments to photovoltaic module 114 shown in FIGS. 7A-7C is intended to illustrate the breadth of changes that can be made to an orientation of photovoltaic module 114 using solar tracking system 100. Generally, photovoltaic module 114 may be made to tip, tilt, rotate, and translate in any direction. However, the angle of tilt may be restricted based on a length of coupling 202. For example, in the embodiment shown in FIG. 7C, photovoltaic module 114 may be tilted about third axis 716 parallel to front edge 708 until front edge 708 contacts middle support 704. Once front edge 708 contacts middle support 704, additional movement of middle support 704 may be undesirable since middle support 704 may apply pressure to front edge 708 that could damage or restrict the movement of photovoltaic module 114. Thus, to ensure that photovoltaic module 114 is able to track through a desired range of motion, lengths of couplings 202 may designed such that photovoltaic module 114 edges will not contact lateral supports 104 even after the desired angle of tilt has been achieved. In an embodiment, couplings 202 may be long enough to allow photovoltaic module 114 to tilt about an east to west axis. e.g., perpendicular to third axis 716, through at least about ±24 degrees to accommodate the seasonal oscillations of the sun between north and south. Similarly, couplings 202 may be long enough to allow photovoltaic module 114 to tilt about third axis 716 through a west to east angle of at least about 30 degrees and preferably up to about 80 degrees to ensure that a majority of solar energy is harvested daily as the sun rises in the East and sets in the West.

Figure 8A:
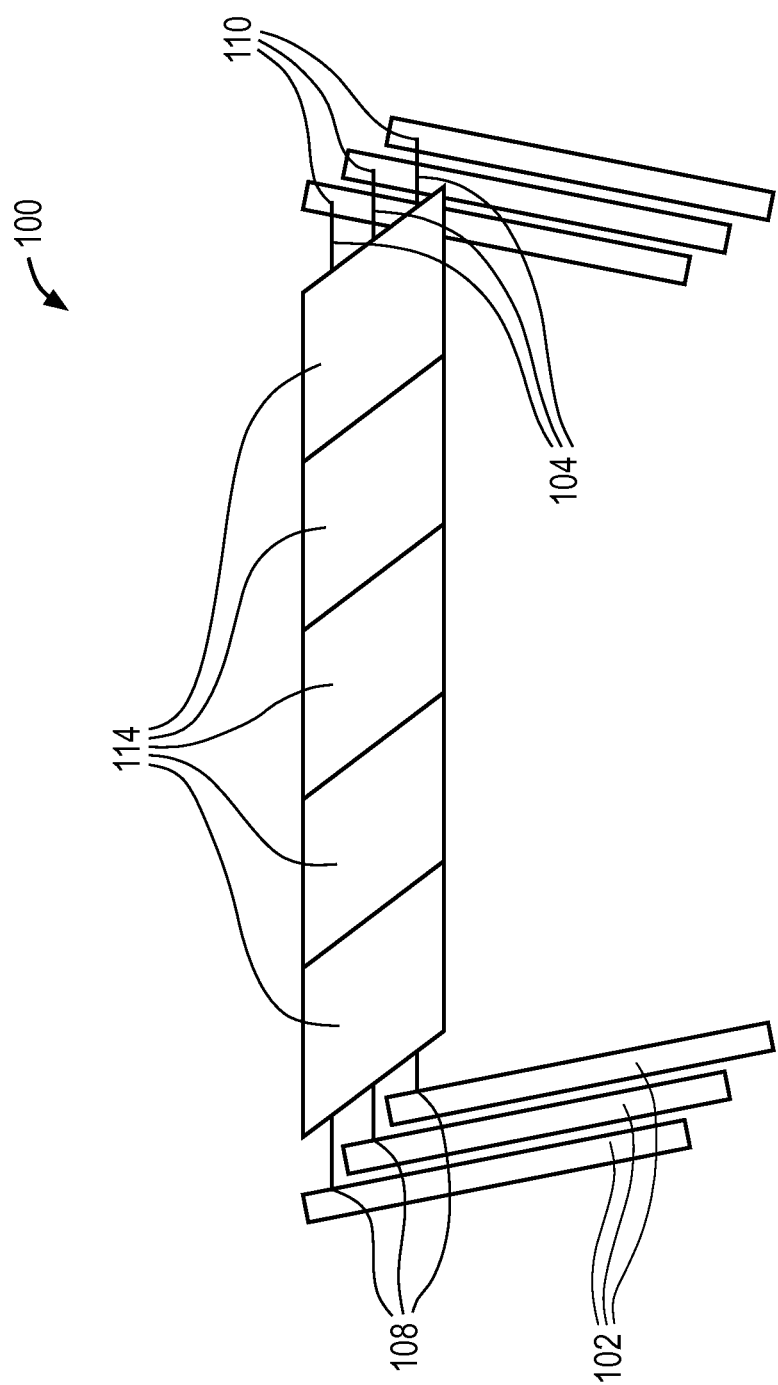
FIGS. 8A-8E are perspective views of an array of photovoltaic modules arranged in various orientations in accordance with several embodiments of the invention.

Referring to FIGS. 8A-8E, perspective views of an array of photovoltaic modules arranged in various orientations are shown in accordance with several embodiments. FIG. 8A shows solar tracking system 100 having three lateral supports 104 associated with uprights 102 and an array of photovoltaic modules 114 supported on the lateral supports 104. The array includes five photovoltaic modules 114 arranged in a row along the lateral supports 104. However, any number of rows and/or columns of photovoltaic module 114 banks may be used to increase the overall size of the solar tracking system 100. For example, the illustrated array may be replicated to form an array with a single column of two rows, i.e., with a second row of five photovoltaic modules 114 placed adjacent to the first row, in order to provide a solar tracking system 100 with a total of ten photovoltaic modules 114. Such replication and arrangement may be used to build a solar tracking system 100 with any amount of photovoltaic modules 114.

Figure 8B:
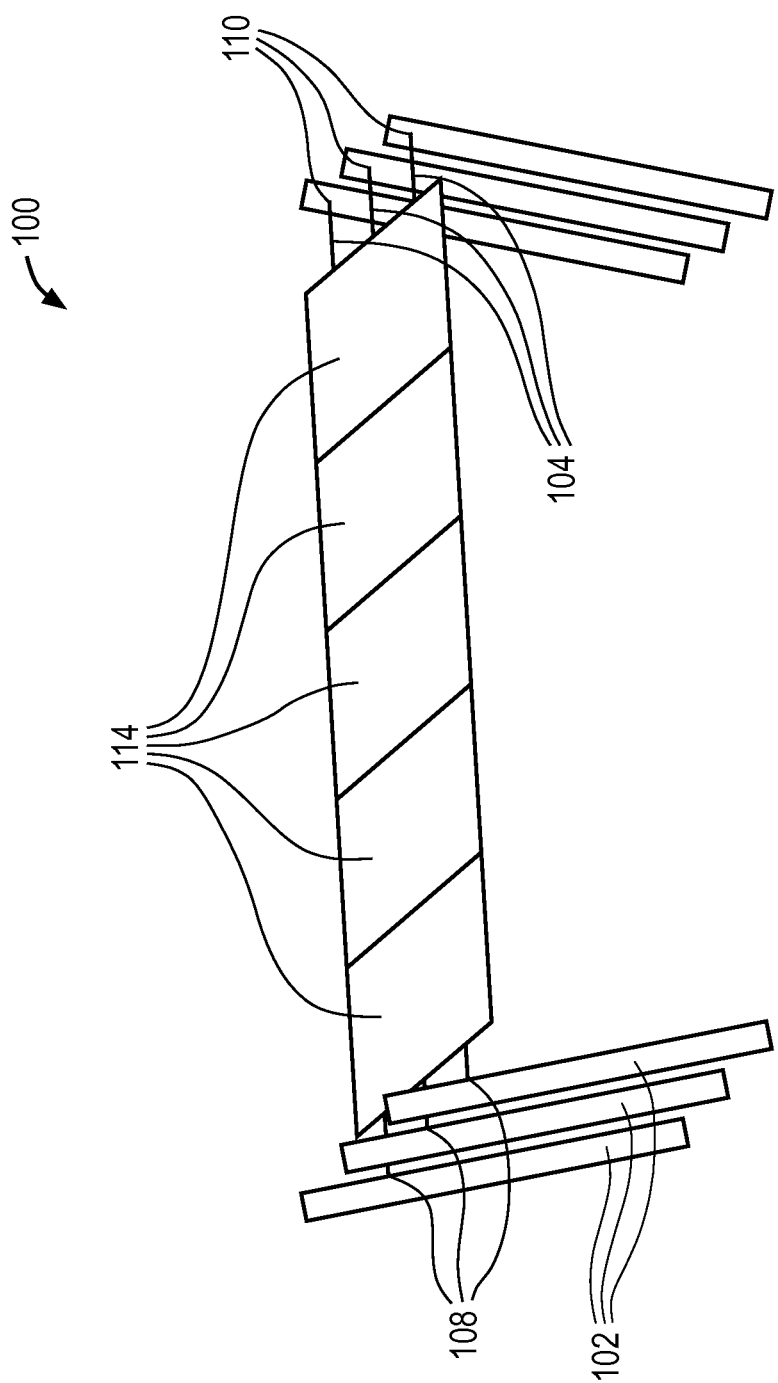

In FIG. 8A, each of the lateral supports 104 may be at roughly the same height and couplings 202 for each lateral support 104 may also be similarly sized such that every photovoltaic module 114 in the array is coplanar and generally facing in a same upward direction. FIG. 8B shows the entire array of photovoltaic modules 114 being simultaneously tilted to a side, while maintaining the faces of each photovoltaic module 114 in a coplanar orientation. More specifically, the first ends 108 of lateral supports 104 in solar tracking system 100 may be lowered along uprights 102 while the second ends 110 of lateral supports 104 are maintained in the same position. Accordingly, all of the lateral supports 104 will move the same amount to slope in a downward angle toward the left. The photovoltaic modules 114, each supported by the lateral supports 104, will therefore also slant downward to the left in unison. Accordingly, the entire array may be angled in a direction to track the sun without risk of one photovoltaic module 114 in a row shading an adjacent photovoltaic module 114 in the same row. Thus, electrical generation by each photovoltaic module in a row may be maximized.

Shading of photovoltaic modules 114 in adjacent rows of an array may also be mitigated by adjusting the height of photovoltaic module 114 rows as compared to a neighboring row. For example, where multiple rows of photovoltaic modules 114 are closely arranged, one row may be lowered to prevent shading of another row. More particularly, where a front row of photovoltaic modules 114 is blocking sunlight from striking a back row of photovoltaic modules 114, all of the lateral supports 104 supporting the front row may be simultaneously lowered to lower the entire row at once while maintaining the same face orientation, and to simultaneously lower the front row sufficiently to stop shading the rear row. Thus, electrical generation by the rear row may be maximized. This ability to individually adjust rows of an array is advantageous because it permits an array to be deployed over minimal site area with less risk of shading caused by overcrowding.

Figure 8C:
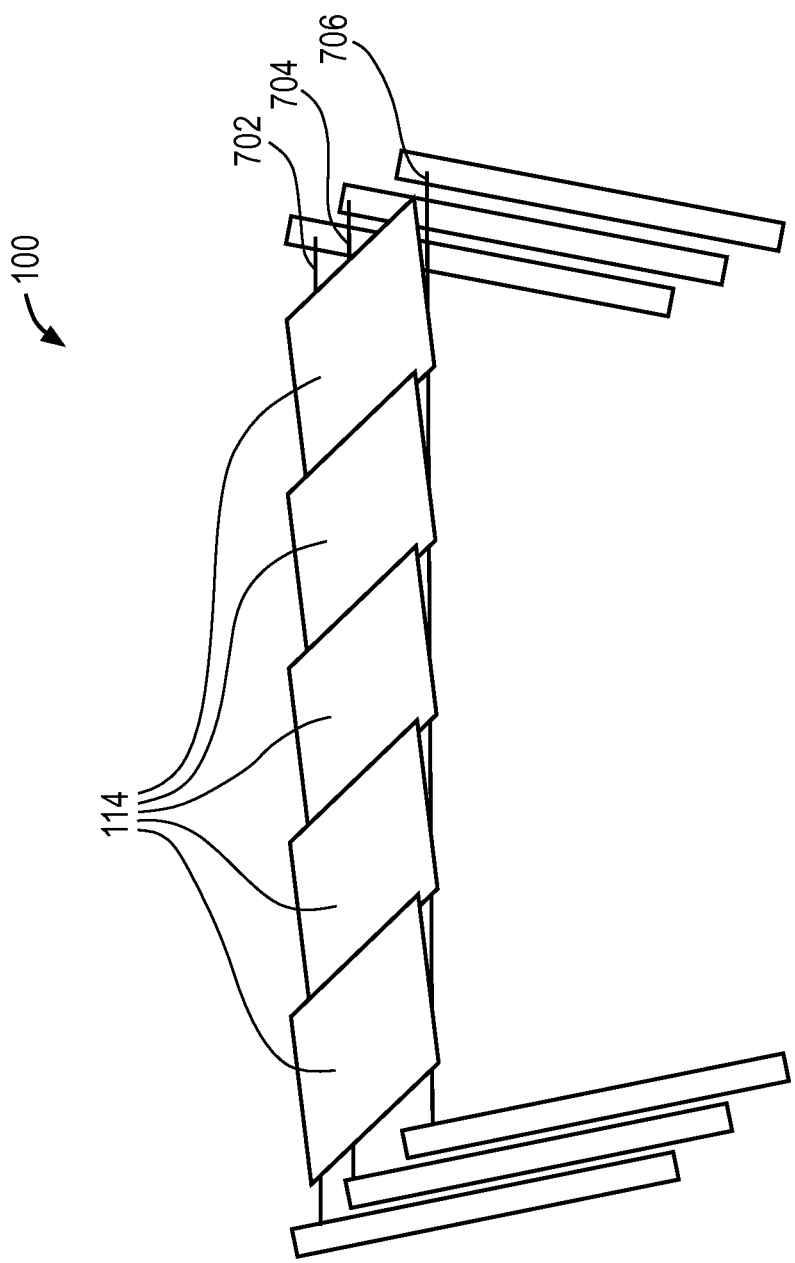

FIG. 8C shows photovoltaic modules 114 within the array being articulated in unison, but in a non-coplanar manner. Similar to the tilting of a single photovoltaic module 114 shown in FIG. 7C, when an array of photovoltaic modules 114 supported by the same lateral supports 104 are simultaneously moved by lifting a middle support 704 while keeping left support 702 and right support 706 stationary, each of the photovoltaic modules 114 tilt about axes parallel to third axis 716. Consequently, respective faces of each of the photovoltaic modules 114 may remain parallel with each other, but not coplanar. In an embodiment, tilting photovoltaic modules 114 in a parallel but non-coplanar fashion may require that lateral supports 104 be able to move from side to side as well as up and down. More specifically, lateral supports 104 may need to slide in a horizontal direction. The actuating assemblies described above may allow for such side to side movement, since the winding of the lateral supports 104 onto actuator 404 as well as the flexible coupling 202 embodiment may inherently accommodate any side to side movement of lateral supports 104. However, alternatively, an additional actuator 404 may be implemented in an actuating assembly to move lateral supports 104 in a horizontal direction to generate the requisite side-to-side motion.

Figure 8D:
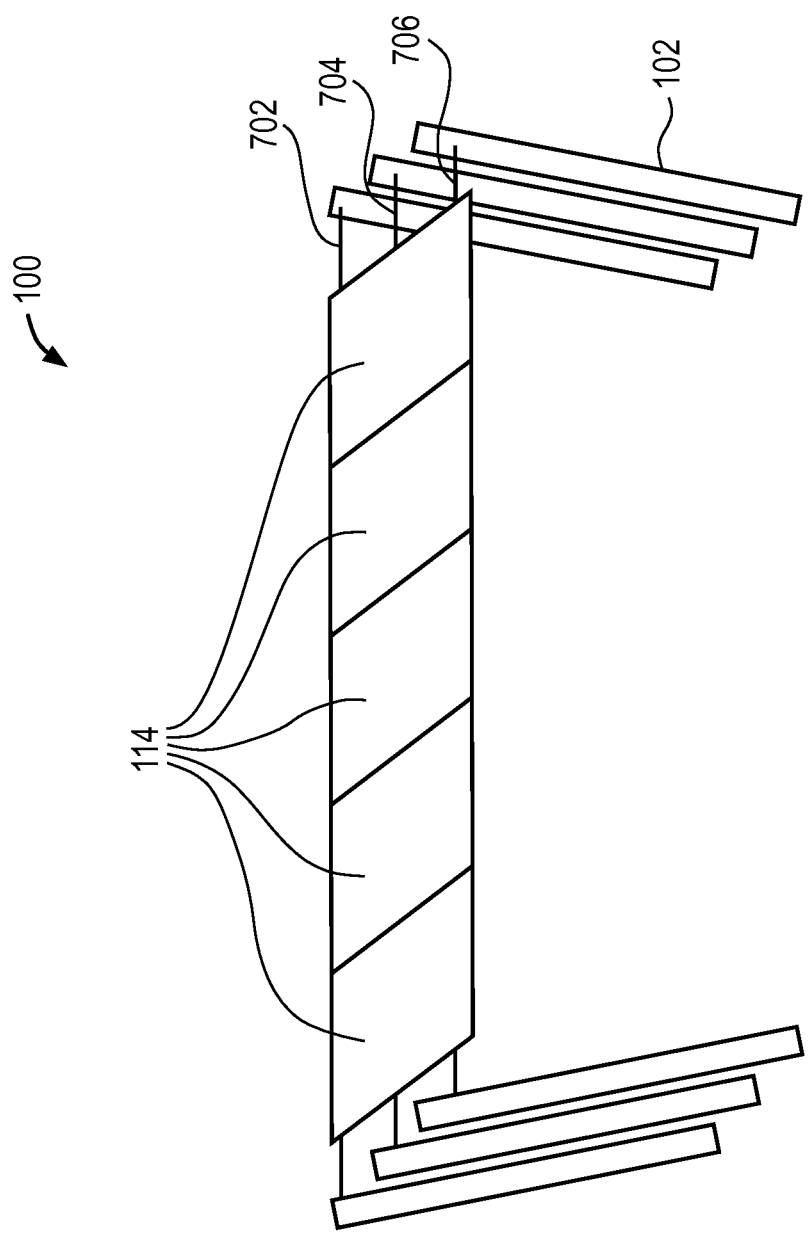

FIG. 8D shows the entire array of photovoltaic modules 114 being tilted forward, while maintaining the faces of each photovoltaic module 114 in a coplanar orientation. More specifically, lateral supports 104 may be moved such that left support 702 is kept at a raised location while middle support 704 and right support 706 are lowered. However, middle support 704 may be lowered less than right support 706, such that the lateral supports 104 remain parallel to each other and a line passing through the lateral supports 104 in a direction perpendicular to the lateral support 104 axes forms a constant downward slope from left to right. Accordingly, photovoltaic modules 114 supported by the lateral supports 104 in solar tracking system 100 may be tilted forward about an axis parallel to the direction of lateral supports 104. For example, an entire array of photovoltaic modules 114 may be kept coplanar and moved from a northern to a southern facing direction in order to track seasonal movements of the sun.

Photovoltaic modules 114 may also be reoriented by solar tracking system 100 to avoid damage due to environmental conditions. For example, photovoltaic modules 114 may be tilted to accommodate snow loading. In an embodiment, when weather forecast data indicates that snow conditions are imminent, or when strain gauges associated with solar tracking system 100 indicates that snow has fallen on photovoltaic modules 114, the array of photovoltaic modules 114 may be tilted in a manner that promotes snow sliding away from photovoltaic modules 114 to reduce weight on the photovoltaic modules 114.

Figure 8E:
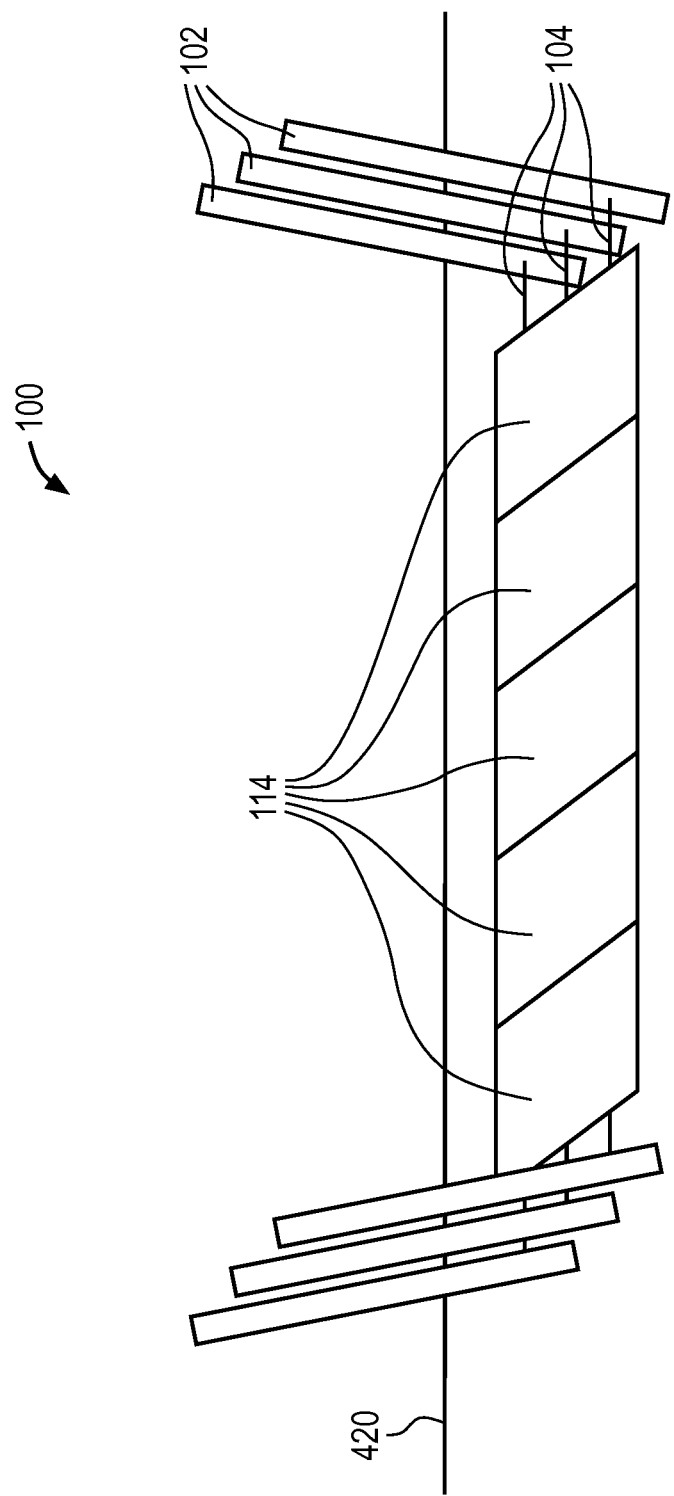

FIG. 8E shows an array of photovoltaic modules 114 being lowered toward the ground 420. In an embodiment, movement of lateral supports 104 downward along uprights 102 will lower an entire bank of photovoltaic modules 114, such as a row of photovoltaic modules 114, from a raised position. In the lowered position, a technician may easily access the photovoltaic modules, couplings, and other components of solar tracking system 100 to repair and/or maintain solar tracking system 100. Furthermore, when the bank of photovoltaic modules 114 is in the lowered position, the surface area exposed to wind loading is reduced, and thus, the risk of damage due to wind loading is correspondingly mitigated. Thus, lowering photovoltaic modules 114 from a raised position to a lowered position may be initiated as part of a control scheme to prevent wind damage when high wind loading is sensed or input as an environmental condition to computer 120 of solar tracking system 100.

Figure 9:
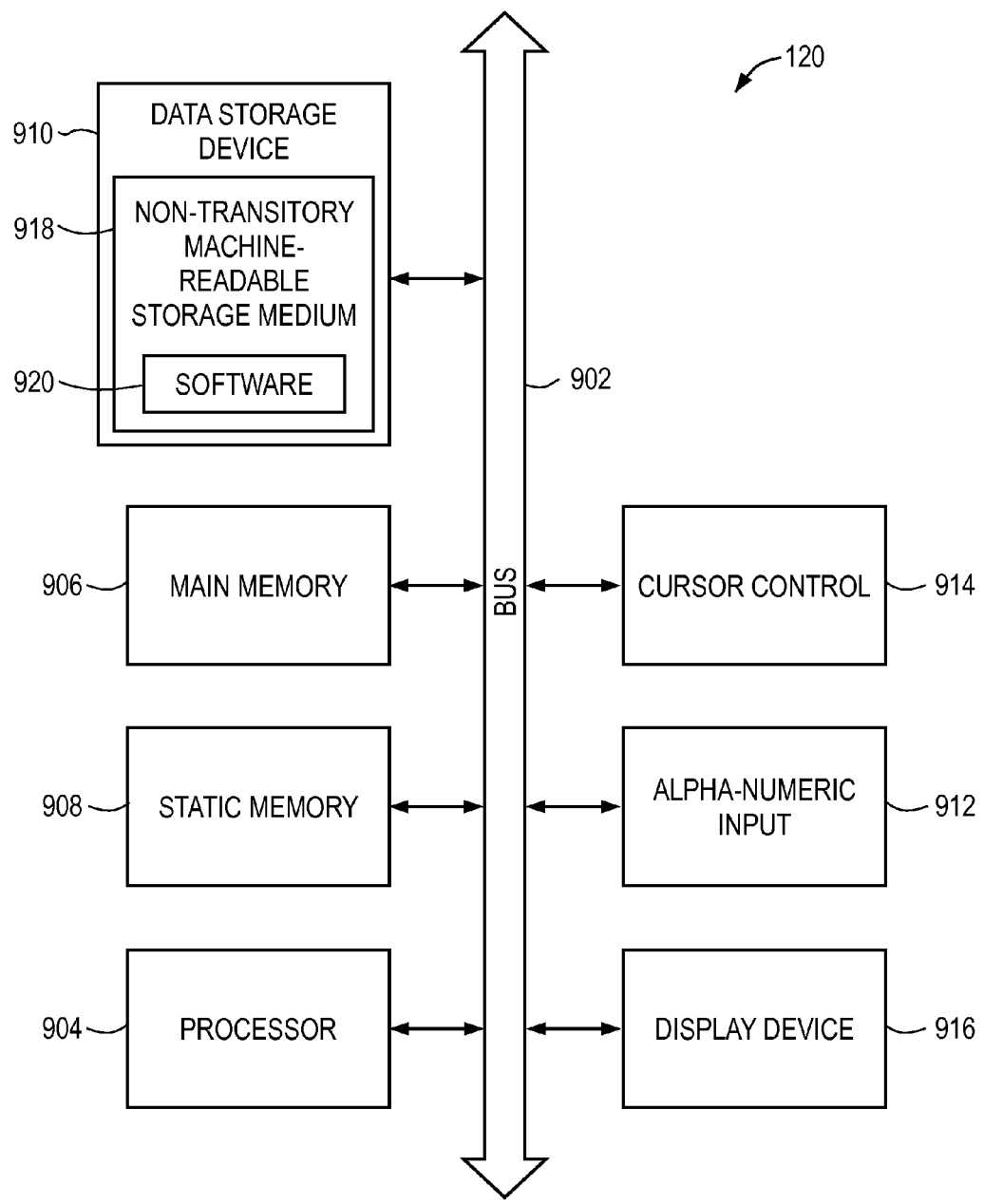
FIG. 9 is a schematic illustration of computer system that may be used in accordance with an embodiment of the invention.

Referring to FIG. 9, a schematic illustration of a computer system that may be used in accordance with an embodiment is shown. The movement of lateral supports 104 and corresponding articulation of photovoltaic modules 114 described above may be controlled by computer 120. More specifically, portions of embodiments are comprised of or controlled by non-transitory machine-readable and machine-executable instructions which reside, for example, in machine-usable media of computer 120. Computer 120 may perform operations based on such instructions to control actuating assembly components in order to orient photovoltaic modules 114 supported by lateral supports 104 toward the sun. Computer 120 is exemplary, and embodiments may operate on or within, or be controlled by a number of different computer 120 systems including general purpose networked computer 120 systems, embedded computer 120 systems, routers, switches, server devices, client devices, various intermediate devices/nodes, stand-alone computer 120 systems, and the like.

Computer 120 may include an address/data bus 902 for communicating information, and a central processor unit 904 connected to bus for processing information and instructions. Computer 120 also includes data storage features such as a computer usable volatile memory 906, e.g. random access memory (RAM), connected to bus for storing information and instructions for central processor unit 904, computer 120 usable non-volatile memory 908, e.g. read only memory (ROM), connected to bus for storing static information and instructions for the central processor unit 904, and a data storage device 910 (e.g., a magnetic or optical disk and disk drive) connected to bus for storing information and instructions. Computer 120 of the present embodiment also includes an optional alphanumeric input device 912 including alphanumeric and function keys connected to bus 902 for communicating information and command selections to central processor unit 904. Computer 120 also optionally includes an optional cursor control device 914 connected to bus 902 for communicating user input information and command selections to central processor unit 904. Computer 120 of the present embodiment may also include an optional display device 916.

The data storage device 910 may include a non-transitory machine-readable storage medium 918 on which is stored one or more sets of instructions (e.g. software 920) embodying any one or more of the methodologies or operations described herein. Software 920 may also reside, completely or at least partially, within the computer usable volatile memory 906, computer 120 usable non-volatile memory 908, and/or within central processor unit 904 during execution thereof by computer 120, the computer usable volatile memory 906, computer 120 usable non-volatile memory 908, and/or central processor unit 904 also constituting non-transitory machine-readable storage media.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated in the figure to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description, various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A solar tracking system comprising:
   a plurality of support tracks;
   one or more upright, each upright comprising a support track of the plurality of support tracks;
   a plurality of lateral supports, wherein each lateral support is connected to a module at a different location, wherein each lateral support is configured to tilt the module about a separate axis, each lateral support of the plurality of lateral supports having a first end, wherein each first end is movable along a respective support track of the plurality of support tracks, wherein the each lateral support is configured to be independently movable along the respective support track of the plurality of support tracks.

2. The solar tracking system of claim 1, wherein the plurality of lateral supports are substantially parallel.

3. The solar tracking system of claim 2, further comprising a plurality of actuating assemblies coupled with the one or more uprights, wherein each lateral support is coupled with at least one actuating assembly, and wherein the one or more actuating assemblies move the first ends along respective uprights.

4. The solar tracking system of claim 3, wherein the one or more actuating assemblies move the first ends vertically.

5. The solar tracking system of claim 3, wherein one or more of the lateral supports include a wire under tension.

6. The solar tracking system of claim 5, wherein each actuating assembly includes an actuator and a tensioner, the lateral support in tension between the actuator and the tensioner.

7. The solar tracking system of claim 6, wherein the actuating assembly includes a guide coupled with the lateral support at the first end, the guide further coupled with one of either the actuator or the tensioner such that actuation of the actuator causes the lateral support to move over the guide.

8. The solar tracking system of claim 7, wherein the actuator causes the lateral support to translate in an axial direction.

9. The solar tracking system of claim 8, wherein the module comprises a photovoltaic module.

10. The solar tracking system of claim 5, wherein the wire is electrically conductive.

11. The solar tracking system of claim 10, wherein the wire is configured to carry electrical signals.

12. A solar tracking system comprising:
    a plurality of uprights;
    a plurality of support tracks, wherein each upright comprises a support track of the plurality of support tracks;
    a photovoltaic module; and
    a plurality of lateral supports, wherein each lateral support of the plurality of lateral supports is configured to be independently movable along a respective support track of the plurality of support tracks;
    wherein each lateral support of the plurality of lateral supports is connected to the photovoltaic module at a different location, and wherein the each lateral support is configured to tilt the photovoltaic module about a separate axis.

13. The solar tracking system of claim 12, wherein the each lateral support of the plurality of lateral supports are substantially parallel to each other.

14. The solar tracking system of claim 12, further comprising:
    a plurality of actuating assemblies, wherein each actuating assembly of the plurality of actuating assemblies is coupled to each upright of the plurality of uprights; and
    wherein at least one lateral support of the plurality of lateral supports is coupled to an actuating assembly of the plurality of actuating assemblies.

15. The solar tracking system of claim 14, wherein each actuating assembly of the plurality of actuating assemblies is configured to move along the respective upright of the plurality of uprights.

16. A solar tracking system comprising:
    a plurality of uprights;
    a plurality of support tracks, wherein each upright comprises a support track of the plurality of support tracks;
    a photovoltaic module; and
    a plurality of lateral supports, wherein a lateral support of the plurality of lateral supports is configured to be independently translatable along a respective support track of the plurality of support tracks;
    wherein each lateral support of the plurality of lateral supports is connected to the photovoltaic module at a different location, and wherein the each lateral support is configured to tilt the photovoltaic module about a separate axis.

17. The solar tracking system of claim 16, wherein the each lateral support of the plurality of lateral supports are substantially parallel to each other.

18. The solar tracking system of claim 16, further comprising:

a plurality of actuating assemblies, wherein each actuating assembly of the plurality of actuating assemblies is coupled to each upright of the plurality of uprights; and wherein at least one lateral support of the plurality of lateral supports is coupled to an actuating assembly of the plurality of actuating assemblies.

* * * * *